March 3, 1959 M. H. THORNTON 2,875,670
ANTI-GLARE DEVICE
Filed Dec. 8, 1954
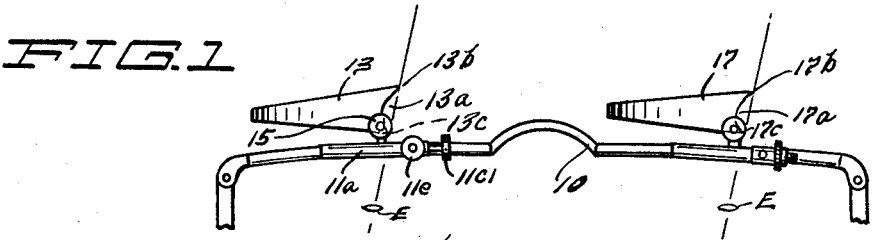
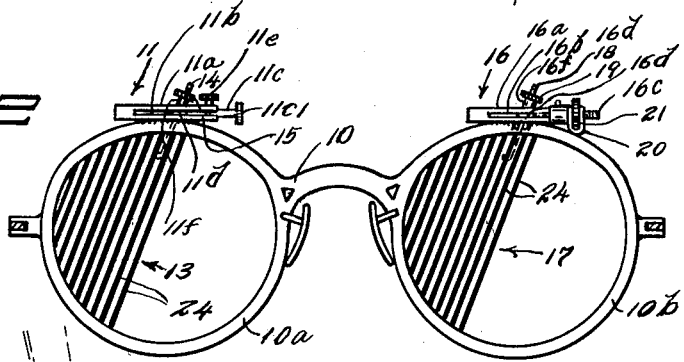
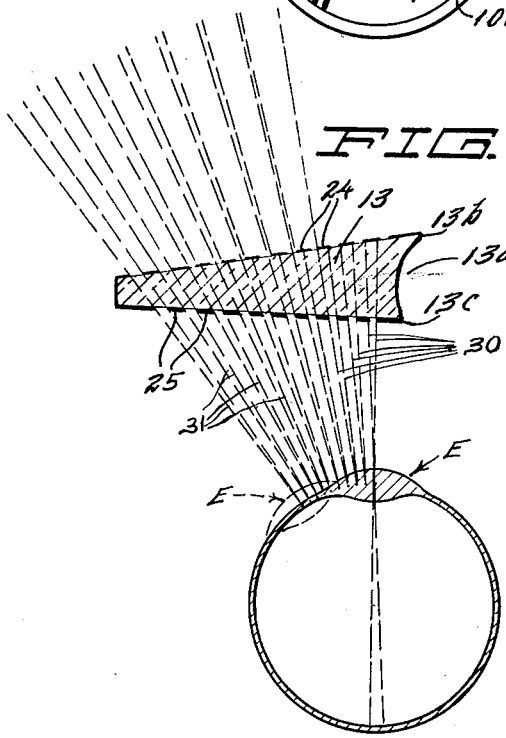
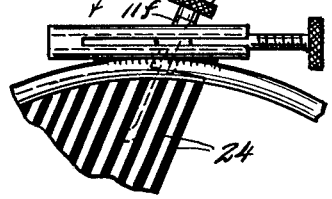
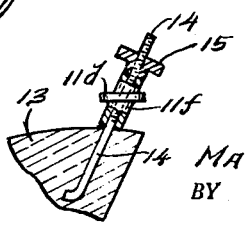
INVENTOR.
MATHEW H. THORNTON
BY Chas. C. Reif
ATTORNEY United States Patent Office 2,875,670
Patented Mar. 3, 1959

2,875,670
ANTI-GLARE DEVICE
Mathew H. Thornton, St. Paul, Minn.
Application December 8, 1954, Serial No. 473,951
4 Claims. (Cl. 88—41)

This invention relates to a device for shielding the eyes of a driver of an automobile from the glare of the headlights of an approaching automobile. This invention is an improvement on that disclosed and claimed in applicant's copending application filed June 17, 1954 on "Glare-Shielding Structure," S. N. 437,422.

It is well known that there is an objectionable glare from the headlights of an approaching automobile, particularly when the headlights of such an automobile are on high beam. This glare increases as the oncoming automobile gets nearer and is at a maximum a short distance before said oncoming automobile passes the other automobile.

In the device of said copending application, similar non-transparent members 13 and 17 were provided for the eyes of the driver respectively and supported in a spectacle-like frame. Each of said members had a rectilinear edge portion comprising edges spaced forwardly and rearwardly of said member. In said prior structure each of said members was movable to bring the spaced edges thereof into a line in the wearer's vision so that a sharp dividing line was formed between two fields of vision. Said members were adjusted so that said sharp dividing line could be located to coincide with the left-hand side of the road on which the wearer was driving. It has been found that said members used in the prior structure had an objection in that being non-transparent a certain field of the normal vision of the driver was blocked off. Authorities in many states have rules that no glare-shielding device will be approved which blocks out a certain field of vision.

It is an object of this invention to provide a device in which a portion of the field of vision is blocked out only for a very short period. Said period will cover the time when the glare of the oncoming vehicle is at its worst.

It is another object of this invention to provide a device comprising a supporting frame and a transparent lens-like member supported thereon for each eye of the operator, each of said members having an edge portion comprising edges spaced in a plane substantially normal to the plane of said members respectively, each of said members having means thereon which will block the vision of the wearer when his eye looks directly at said member but will permit partial vision through said member when his eye looks laterally at said member or looks at said member at an angle.

It is a further object of the invention to provide such a device as set forth in the preceding paragraph, said device comprising spaced non-transparent bands extending across each of said members substantially parallel to said edges thereof.

These and other objects and advantages of the invention will be fully set forth in the following description made in connection with the accompanying drawings in which like reference characters refer to similar parts throughout the several views and in which:

Fig. 1 is a top plan view of the device;
Fig. 2 is a view in front elevation of the device;
Fig. 3 is a diagrammatic view illustrating the operation of the device;
Fig. 4 is a partial view similar to Fig. 2 but shown on an enlarged scale;
Fig. 5 is a view showing a modified form of one of the members used;
Fig. 6 is a view in side elevation showing a modified form of the lens-like member; and
Fig. 7 is a partial view in front elevation similar to Fig. 2, shown on an enlarged scale with portions shown in vertical section.

Referring to the drawings, a device is shown comprising a frame 10. While frame 10 can be of any suitable and efficient construction, in the embodiment of the invention illustrated it is shown as a frame similar to or like the ordinary spectacle frame. If a person was accustomed to wearing spectacles, the regular spectacle lenses could be disposed in the regular places therefor in frame 10.

In accordance with the present invention, a supporting member 11 is secured to the top one lens-holding portion 10a of frame 10. Said supporting member has a tubular portion 11a, which portion has a longitudinally extending slot 11b at its front side which extends to the bore of portion 11a and substantially the full length thereof. A rod 11c is slidable in tubular portion 11a for movement longitudinally thereof. One end of rod 11c projects from portion 11a and is provided with a cylindrical head 11c1 roughened or knurled so as to be gripped easily. A lug 11d is secured to rod 11c and projects laterally through the slot 11b. A set screw 11e is provided threaded into the top of portion 11a and is adapted to hold member 11c in any desired position longitudinally of member 11a. A tubular member 11f of short length is secured at substantially its central portion to lug 11d and extends above and below said lug. Said portion 11f is illustrated as being inclined at an angle to the central vertical axis of the lens opening in portion 10a. A lens-like member 13 is provided which may be made of any suitable transparent material and preferably is of a size which will be a substantial portion of the lens opening in portion 10a. In the embodiment of the invention illustrated in Fig. 2, member 13 is in the form of a segment which might fit within the lens opening in portion 10a. Member 13, as seen in Fig. 1, tapers toward one end and has in its wider end a concave recess 13a. The edge portion of member 13 is rectilinear and due to recess 13a has edges 13b and 13c spaced forwardly and rearwardly of member 13 and frame 10. Member 13 is supported by a rod-like member 14, the lower end of which is imbedded in and thus secured to member 13 and the upper portion of which is rod-like and extends through a bore in member 11f. The upper end portion of member 14 is threaded and a nut 15 having an upper hand wheel portion is threaded on member 14. Member 13 can thus be turned about the axis of member 14 and can be held in the desired position by member 13 being clamped against member 11f.

A supporting member 16, similar to member 11, is secured in any suitable manner, as by soldering or welding, to the top central portion of the frame portion 10b. Member 16 comprises a tubular portion 16a having a longitudinally extending slot 16b extending horizontally and forwardly therethrough to the bore thereof and substantially for the full length thereof. A rod 16c having a threaded outer end is disposed in the bore of member 16a. Rod 16c has a lug 16d secured to substantially the central portion thereof and extending forwardly through said slot 16b. A short tubular member 16f is secured substantially at its central portion to lug 16d and the same extends at an angle to the vertical central axis of the lens opening in frame portion 10b. A lens-like member 17 is provided similar in shape and dimensions to member 13. Member 17 has a rectilinear edge portion at its wider end having a concave recess 17a so that said edge portion has spaced edges 17b and 17c which extend at an angle to the vertical axis of the frame portion 10b. Member 17 thus also is of segmental shape in front elevation. A supporting member 18 is provided having a rod-like lower portion which is embedded in and secured to member 17. Member 18 extends upwardly through portion 16f and is threaded at its upper end to receive a small hand wheel 19. A bracket 20 of general U shape is secured to one end of member 16a and member 16c extends therethrough. Member 16c is threaded and a nut 21 in the form of a knurled wheel is threaded on member 16c and disposed between the sides of bracket 20.

With the described structure, member 13 can be manually turned about the axis of rod 14 and can be held in its adjusted position by clamping nut 13 against the upper end of portion 11f. Member 13 can be moved longitudinally transversely of frame 10 by moving rod 11c. It can be held in the desired position by the set screw 11e. Member 17 can be swung by hand and clamped in the desired position by hand wheel 19. Member 17 can be moved transversely of the frame 10 and horizontally by turning hand wheel 21 and thus moving rod 16c and member 16f.

Members 13 and 17 are each provided at their opposite sides with a number of non-transparent bands 24 and 25 respectively. These bands are arranged as shown in Figs. 3 and 4.

In operation, the wearer will first move member 13 about the axis of rod 14 to bring the edges 13b and 13c into alinement so that a sharp line is formed between two fields of the wearer's vision. With the wearer looking straight ahead this line will be preferably located to aline with the left-hand side of the road on which the wearer is driving. Member 13 may have to be moved longitudinally. Member 17 will next be moved angularly to bring its edges 17b and 17c into alinement and form a sharp line between two fields of vision. Member 17 may have to be moved longitudinally. A sharp line formed by the edges 17b and 17c will also be located to aline with the left-hand side of the road on which the wearer is driving when the driver is looking forwardly directed at member 17. When another automobile approaches, the wearer can move his head slightly to the right and bring said sharp line into register with the central stripe on the road. The driver will now look directly forwardly at members 13 and 17 and the relationship of his eye and said members is illustrated in Fig. 3. In said figure his eye is indicated as E and his line of vision as 30. As shown in Fig. 3, his vision will be blocked by the bands 25 on the near side of member 13 and also by bands 24 on the far side as indicated. Everything to the left of said sharp dividing line will thus be blocked out. The headlights of the approaching vehicle will be blocked out and the glare will be eliminated. It is only necessary to have said sharp line alined with the central portion of the road for a very short period of time. When the automobile has passed, the driver can again turn his head slightly to the left so that he can see all of the road. His line of vision will also include a field at the left of his eye. As he looks to the left at an angle to members 13 and 17 he will be able to see between the spaces 25 and 24 at the opposite sides of the members 13 and 17 respectively, by lines of vision 31, as shown in Fig. 3. A sharp vision or one which is not blurred is produced by having the edges of bands 25 and 24 spaced from each other in the direction of vision just as edges 13b and 13c are spaced from each other. He will thus have partial vision of what is at the left side of his vision and it will not be entirely blocked out as it would be if the members 13 and 17 were non-transparent or opaque.

In Fig. 5 a member 32 is shown which could be used in place of the members 13 and 17. Member 32 will be identical with members 13 and 17 except that it is of one transverse dimension throughout and is not tapered, as are members 13 and 17.

In Fig. 6 a member 34 is shown which can be used in place of the members 13 and 17. Member 34 is similar to members 13 and 17 except that it has a portion cut away at its upper part. When an approaching vehicle is at some distance the headlights thereof appear smaller and would be adequately covered by the upper portion 34a of member 34. The glare effect increases as the approaching vehicle comes nearer. As the vehicle comes nearer, the headlights would be covered by the lower portion 34b of member 34. When the glare is most objectionable therefore the headlights will be blocked out by member 34 since the headlights would be in line with the larger lower portion 34b of said member. With the member 34 the driver would have quite an additional unlimited vision.

From the above description it will be seen that I have provided a glare-shielding device which has a much greater field of vision than one where the members 13 and 17 would be non-transparent or opaque. The bands 24 and 25 can be provided at very small expense and will constitute a great improvement.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A glare-shielding device in connection with a spectacle frame having in combination, a member forming a segment of transparent material having flat surfaces at opposite sides thereof, means carried by said spectacle frame for holding said member in front of a lens opening in said frame, said means including pivot means for swinging said member about substantially a vertical axis and said holding means being movable longitudinally of said frame, said member having a rectilinear edge portion of substantial thickness, said edge portion being concave in transverse section and forming spaced parallel edges, said edges being disposed in substantially a vertical direction for forming in the line of vision a vertical sharp line lying in the plane formed by said edges, said pivot means having an axis extending substantially parallel to said edges whereby said member may be pivoted to change the position of said sharp line, said opposite sides respectively having thereon narrow spaced opaque stripes respectively parallel to said edge portions, said stripes being respectively aligned on said opposite sides with one another so as to provide a clear line of vision therebetween through said member in a direction oblique to the plane of the side of said member nearer said spectacle frame and to provide an obstructed line of vision through said member in a direction at right angles to the plane of said nearer side.

2. The structure set forth in claim 1, and said opposite sides of said member converging away from said spaced edges.

3. The structure set forth in claim 1, and said pivot means comprising a lug adapted to swingably carry said member in front of a lens opening of said frame, and means on said frame for supporting said lug and for movement of said lug longitudinally of said frame.

4. The structure set forth in claim 1, and said pivot means comprising a tubular member carried by said frame longitudinally thereof, a lug movable along said tubular member extending outwardly thereof forwardly of a lens opening in said frame, and means rotatably securing said member to said lug for swinging movement of said member about substantially a vertical axis.

References Cited in the file of this patent

UNITED STATES PATENTS

| | | |
|---|---|---|
| 1,227,462 | Luckiesh | May 22, 1917 |
| 1,600,461 | Ensign | Sept. 21, 1926 |
| 1,938,085 | Page | Dec. 5, 1933 |
| 2,660,728 | Thornton | Dec. 1, 1953 |

FOREIGN PATENTS

| | | |
|---|---|---|
| 489,442 | Great Britain | July 26, 1938 |
| 1,040,488 | France | May 20, 1953 |